US012585260B2

(12) United States Patent
Perumalla et al.

(10) Patent No.: US 12,585,260 B2
(45) Date of Patent: Mar. 24, 2026

(54) COMPUTER-BASED VIRTUAL ENVIRONMENT FOR MANAGING WORK PRODUCT QUALITY

(71) Applicant: International Business Machines Corporation, Armonk, NY (US)

(72) Inventors: Saraswathi Sailaja Perumalla, Visakhapatnam (IN); Sarbajit K. Rakshit, Kolkata (IN); Swapna Sridantuluri, Visakhapatnam (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 17/929,366

(22) Filed: Sep. 2, 2022

(65) Prior Publication Data

US 2024/0077858 A1 Mar. 7, 2024

(51) Int. Cl.
*G05B 19/418* (2006.01)

(52) U.S. Cl.
CPC . *G05B 19/41885* (2013.01); *G05B 19/41865* (2013.01); *G05B 19/4188* (2013.01)

(58) Field of Classification Search
None
See application file for complete search history.

(56) References Cited

U.S. PATENT DOCUMENTS

| | | | | |
|---|---|---|---|---|
| 9,400,490 | B2 * | 7/2016 | Turolla | G05B 9/02 |
| 12,085,930 | B2 * | 9/2024 | Rakshit | G05B 19/4184 |

| | | | | |
|---|---|---|---|---|
| 2018/0196409 | A1 * | 7/2018 | Ben-Bassat | G06Q 10/06 |
| 2019/0129607 | A1 * | 5/2019 | Saurabh | G06F 3/011 |
| 2019/0138333 | A1 * | 5/2019 | Deutsch | G06Q 10/0631 |
| 2019/0340843 | A1 * | 11/2019 | McCarson | G06F 18/24 |
| 2019/0384245 | A1 * | 12/2019 | Ciciriello | G05B 23/0254 |
| 2020/0265329 | A1 * | 8/2020 | Thomsen | G06N 20/10 |
| 2022/0095157 | A1 * | 3/2022 | Volkerink | H04W 24/10 |

(Continued)

FOREIGN PATENT DOCUMENTS

| | | |
|---|---|---|
| CN | 103886147 A | 6/2014 |
| CN | 109977435 A | 7/2019 |

OTHER PUBLICATIONS

Qi et al., "Digital Twin and Big Data Towards Smart Manufacturing and Industry 4.0: 360 Degree Comparison", Feb. 28, 2018, IEEE Access, pp. 3585-3593 (Year: 2018).*

(Continued)

*Primary Examiner* — Jason Lin
(74) *Attorney, Agent, or Firm* — Joseph P. Curcuru

(57) ABSTRACT

In an approach to improve manufacturing quality, embodiments of the present invention dynamically monitor a degree of influencing factors in a predetermined area, and identify one or more machines used in a predetermined manufacturing process. Further, embodiments generate a digital twin of a predetermined final product associated with the predetermined manufacturing process, and analyze an effect of the influencing factors on the identified one or machines or the predetermined final product. Additionally, embodiments identify upper limit of the influencing facts, and output proposed changes to prevent the effects of the influencing factors based on the identified upper limit.

20 Claims, 4 Drawing Sheets

(56)                References Cited

U.S. PATENT DOCUMENTS

| | | | |
|---|---|---|---|
| 2022/0138376 A1* | 5/2022 | Li | G06F 30/20 |
| | | | 703/7 |
| 2022/0197246 A1* | 6/2022 | Cella | G05B 19/41865 |
| 2022/0269259 A1* | 8/2022 | Albrecht | G06Q 50/04 |
| 2023/0281439 A1* | 9/2023 | Maher | G06N 3/044 |
| | | | 706/16 |

OTHER PUBLICATIONS

Armstrong, Maggie Mae, "Cheat sheet: What is Digital Twin?", IBM Blogs, Dec. 4, 2020, 10 pages, <https://www.ibm.com/blogs/internet-of-things/iot-cheat-sheet-digital-twin/>.

Ebabu Engidaw, Abriham, "The effect of external factors on industry performance: the case of Lalibela City micro and small enterprises, Ethiopia", Journal of Innovation and Entrepreneurship, Issue 10, Article 10, Mar. 1, 2021, 14 pages, <https://innovation-entrepreneurship.springeropen.com/articles/10.1186/s13731-021-00147-7>.

Ekren, et al., "A simulation based experimental design to analyze factors affecting production flow time", Simulation Modelling Practice and Theory, vol. 16, Mar. 2008, pp. 278-293, <https://www.researchgate.net/publication/220675047_A_simulation_based_experimental_design_to_analyze_factors_affecting_production_flow_time>.

Khan, Jamshed, "Everything you need to know about Visual Inspection with AI", Nanonets, Blog, Copyright © 2021 Nano Net Technologies Inc, 29 pages, <https://nanonets.com/blog/ai-visual-inspection/>.

Lin, et al., "Digital Twin and IIoT in Optimizing Manufacturing Process and Quality Management", IIC Journal of Innovation, Mar. 2021, 24 pages, <https://www.iiconsortium.org/pdf/2021_March_JoI_Digital_Twin_and_IIoT_in_Optimizing_Manufacturing_Process_and_Quality_Management_SA.pdf>.

Mell, et al., "The NIST Definition of Cloud Computing", National Institute of Standards and Technology, Special Publication 800-145, Sep. 2011, 7 pages.

Unknown, "The Probabilistic Digital Twin Concept", DNV, AI + Safety, © Copyright 2018, DNV, 6 pages, <https://ai-and-safety.dnvgl.com/probabilistic-twin/probabilistictwin.html>.

Wang, Zongyan, "Digital Twin Technology", Industry 4.0—Impact on Intelligent Logistics and Manufacturing, Chapter Metrics Overview, Mar. 18, 2020, 32 pages, <https://www.intechopen.com/chapters/63861>.

* cited by examiner

COMPUTER-BASED VIRTUAL ENVIRONMENT FOR MANAGING WORK PRODUCT QUALITY

BACKGROUND OF THE INVENTION

The present invention relates generally to digital twin computing systems, and more particularly to the field of digital twin simulations.

A digital twin is a virtual model designed to accurately reflect a physical object. The object being studied—for example, a wind turbine—is outfitted with various sensors related to vital areas of functionality. These sensors produce data about different aspects of the physical object's performance, such as energy output, temperature, weather conditions and more. This data is then relayed to a processing system and applied to the digital copy. Once informed with such data, the virtual model can be used to run simulations, study performance issues and generate possible improvements, all with the goal of generating valuable insights— which can then be applied back to the original physical object.

Although simulations and digital twins both utilize digital models to replicate a system's various processes, a digital twin is actually a virtual environment, which makes it considerably richer for study. The difference between digital twin and simulation is largely a matter of scale: while a simulation typically studies one particular process, a digital twin can itself run any number of useful simulations in order to study multiple processes. The differences don't end there. For example, simulations usually don't benefit from having real-time data. But digital twins are designed around a two-way flow of information that first occurs when object sensors provide relevant data to the system processor and then happens again when insights created by the processor are shared back with the original source object.

SUMMARY

Embodiments of the present invention disclose a computer-implemented method, a computer program product, and a system, the computer-implemented method comprising: dynamically monitoring a degree of influencing factors in a predetermined area; identifying one or more machines used in a predetermined manufacturing process; generating a digital twin of a predetermined final product associated with the predetermined manufacturing process; analyzing an effect of the influencing factors on the identified one or machines or the predetermined final product; identifying upper limit of the influencing facts; and outputting proposed changes to prevent the effects of the influencing factors based on the identified upper limit.

The computer system comprising: one or more computer processors; one or more computer readable storage devices; program instructions stored on the one or more computer readable storage devices for execution by at least one of the one or more computer processors, the stored program instructions comprising: program instructions to dynamically monitor a degree of influencing factors in a predetermined area; program instructions to identify one or more machines used in a predetermined manufacturing process; program instructions to generate a digital twin of a predetermined final product associated with the predetermined manufacturing process; program instructions to analyze an effect of the influencing factors on the identified one or machines or the predetermined final product; program instructions to identify an upper limit of the influencing facts; and program instructions to output proposed changes to prevent the effects of the influencing factors based on the identified upper limit.

The computer program product comprising: one or more computer readable storage devices and program instructions stored on the one or more computer readable storage devices, the stored program instructions comprising: program instructions to dynamically monitor a degree of influencing factors in a predetermined area; program instructions to identify one or more machines used in a predetermined manufacturing process; program instructions to generate a digital twin of a predetermined final product associated with the predetermined manufacturing process; program instructions to analyze an effect of the influencing factors on the identified one or machines or the predetermined final product; program instructions to identify an upper limit of the influencing facts; and program instructions to output proposed changes to prevent the effects of the influencing factors based on the identified upper limit.

DETAILED DESCRIPTION

Figure 1A:
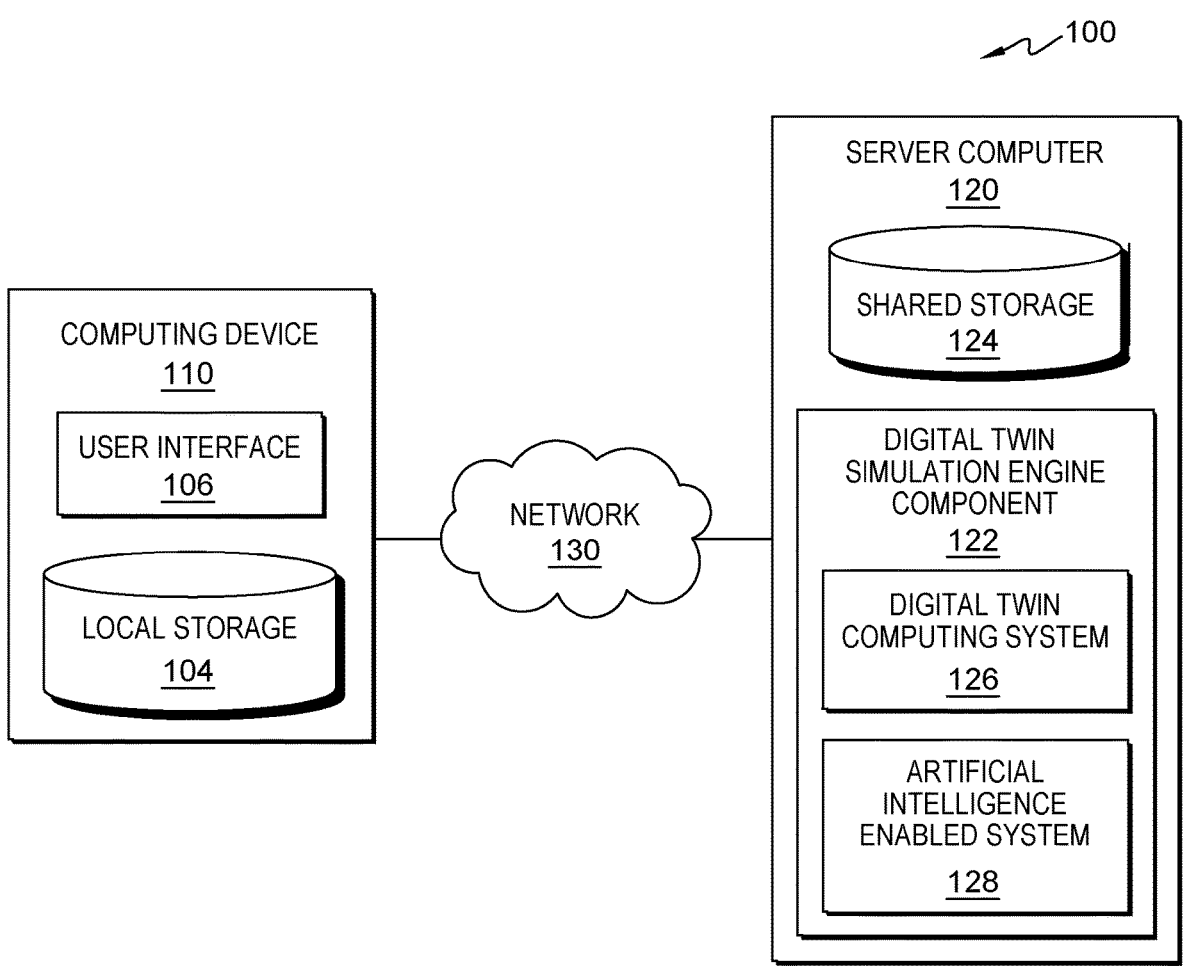
FIG. 1A is a functional block diagram illustrating a distributed data processing environment, in accordance with an embodiment of the present invention.

Embodiments of the present invention recognize that in any industrial floor, there can be different types of machines, such as metal cutting machine, casting machines, drilling machines, etc. Embodiments of the present invention recognize that the work products are manufactured by such machines may be assembled together to make other machines or devices. The quality of the work products from each of the machines are dependent on the health of the initial machine of manufacture, and the type and quality of raw material. Embodiments of the present invention recognize that internal and/or influencing factors (influencing factors) are also an important parameter regarding the quality of the work product manufactured by any machine. The influencing factors can be, but are not limited to, propagated vibration from the connected machine, wind flow is causing unbalance force, dust in the surrounding might lower the quality of surface finishing and casting product. Therefore, embodiments of the present invention recognize that in any machine shopfloor, controlling the influencing factors and identifying how much of the influencing factors is needed to be controlled to improve the quality of the work product is an issue that needs to be solved.

Embodiments of the present invention improve the art and solve at least the problems stated above by (i) considering different types of influencing factors and simulating the impact of those influencing factors on identified machines to identify if the health and/or performance/working conditions of the machines will be impacted by the influencing factors, wherein an AI enabled system outputs recommendations associated controlling the influencing factors in the surrounding area, (ii) simulating the presence of various influencing factors, wherein if those influencing factors can degrade the quality of the work product or machine can address those influencing factors, wherein the AI enabled system identifies how to control the influencing factors to maintain the quality of the work products, (iii) considering different types of influencing factors, and during simulation, different combination of influencing factors, different levels of influencing factors to identity what would be the maximum allowed level of influencing factors on the said machines so that the machines or the work products are not impacted because of the influencing factors, (iv) analyzing different types of influencing factors, feeds from the digital twin simulation on the impact of the influencing factors, wherein embodiments of the proposed invention generate and output recommendations associated with designing and/or arranging a predetermined area to optimally control the influencing factors, (v) analyzing the feed from the digital twin simulation, and accordingly identifying one or more influencing factor, wherein the AI enabled system predicts any impact in the machine or work product and proactively implements automated actions so that the influencing factors can be prevented; and (vi) simulating results, based on the identified influencing factor, concerning the influence of influencing factors on the machines, work product, wherein embodiments of the present invention generates and outputs proposals associated repair projects to be performed in the workplace so that the impact of the influencing factor can be prevented.

Implementation of embodiments of the invention may take a variety of forms, and exemplary implementation details are discussed subsequently with reference to the Figures (i.e., FIG. 1A-FIG. 3).

FIG. 1A is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1A) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1A, computing device 110 may have a plurality of interfaces 106. In other embodiments, not depicted in FIG. 1A, distributed data processing environment 100 may comprise a plurality of computing devices, plurality of server computers, and/or one a plurality of networks. Computing device 110 may include internal and external hardware components, as depicted, and described in further detail with respect to FIG. 3.

User interface (interface) 106 provides an interface to digital twin simulation engine component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 3. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1A, in addition to shared storage 124, server computer comprises a primary and a secondary database, described below in FIG. 3.

In the depicted embodiment, component 122 is executed on server computer 120. In other embodiments, component 122 may be executed on computing device 110. In various embodiments of the present invention, not depicted in FIG. 1A, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In the depicted embodiment, component 122 comprises digital twin computing system (system) 126 and artificial intelligence (AI) enabled system (AI system) 128. In some embodiment, system 126 and AI system 128 may execute anywhere within distributed data processing environment 100 as long as system 126 and AI system 128 are connected to and/or communicate with component 122, server computer 120, and/or computing device 110.

Component 122, via digital twin computing system 126, may consider a plurality of different types of influencing factors (i.e., a plurality of influencing factors) and may simulate the impact of the considered plurality of influencing factors using one or more predetermined or identified machines to identify the health of said machines. The generated simulations may identify the working condition of the predetermined or identified machines based on the plurality influencing factors, and accordingly artificial intelligence (AI) enabled system 128 may recommend how the plurality of influencing factors can be controlled from the surrounding area in order to improve the health and working conditions of the machines. In various embodiments, component 122, via digital twin computing system 126, simulates the presence of a plurality of predetermined or identified influencing factors and if those predetermined or identified influencing factors can degrade the quality of the work product or machine then component 122 addresses those influencing factors, wherein component 122, via digital twin computing system 126, considers different types of external influencing factors and by simulating the impact it recommends favorable or tolerant intensity levels, as they are known and understood in the art, of the factors. In various embodiments, the favorable or tolerant intensity levels are predetermined. Accordingly, in various embodiments, AI enabled system 128 identifies one or more ways to control the influencing factors to maintain the quality of the work products, wherein AI enabled system 128 generates a new method to control the influencing factors based on historic methods of controlling influencing factors stored on local storage 104 and/or shared storage 124 or identifies and retrieves a previously used method to control the influencing factors based on historic methods of controlling influencing factors stored on local storage 104 and/or shared storage.

In some embodiments, component 122, via AI enabled system 128, may execute an internet search to retrieve and utilize data from said internet search to identify and generate a new method control the influencing factors. In various embodiments, component 122 considers a plurality of different types of influencing factors, and during simulation, various combinations of influencing factors, different level of influencing factors to identity what would be the allowed level of influencing factors on the said machines so that the machines or the work products are not impacted because of the influencing factors. Component 122, via AI enabled system 128, may analyze different types of influencing factors, feeds from the digital twin simulation on the impact of the influencing factors, wherein component 122 may generate and output a recommendation/proposed plan of how the workplace surrounding should be designed so that the workplace can control the influencing factors. For example, the digital twin simulation model (i.e., component 122) recommends optimal arrangement of industry machinery in a predetermined area based on various external parameters such as wind flow intensity, dust in the air and its intensity, heat wave intensity inside the industrial floor. In various embodiments, component 122 analyzes the feed from the digital twin simulation, and accordingly identifies one or more influencing factor, wherein AI enabled system 128 predicts any impact to the machine or work product that may be caused by the one or more influencing factors, and will proactively be execute and manage automated activity to prevent the influencing factors. Component 122, based on the identified influencing factor, may simulate results regarding the influence of the influencing factors on the machines, work product, wherein component 122 may identify and output repairs to the machines so that the impact of the influencing factor can be prevented or remedied.

For example, component 122, via system 126, simulates various influencing factors associated with machines involved in a manufacturing process to identify how the influencing factors affect the quality of the work product and/or the machines. Component 122 may identify the level/amount of influencing factors needed to affect the quality of the work product and/or the machines (i.e., limit of influencing factors). Component 122 may modify the work environment to prevent or limit the impact of influencing factors on the machines and/or work product by controlling the influencing factors in the work environment, recommending steps to be performed to limit/prevent the effects of the influencing factors, and/or executing identified automated steps to prevent the effects of the influencing factors. Preventative steps and/or actions are predetermined steps and/or actions that are known an used in the art.

Figure 1B:
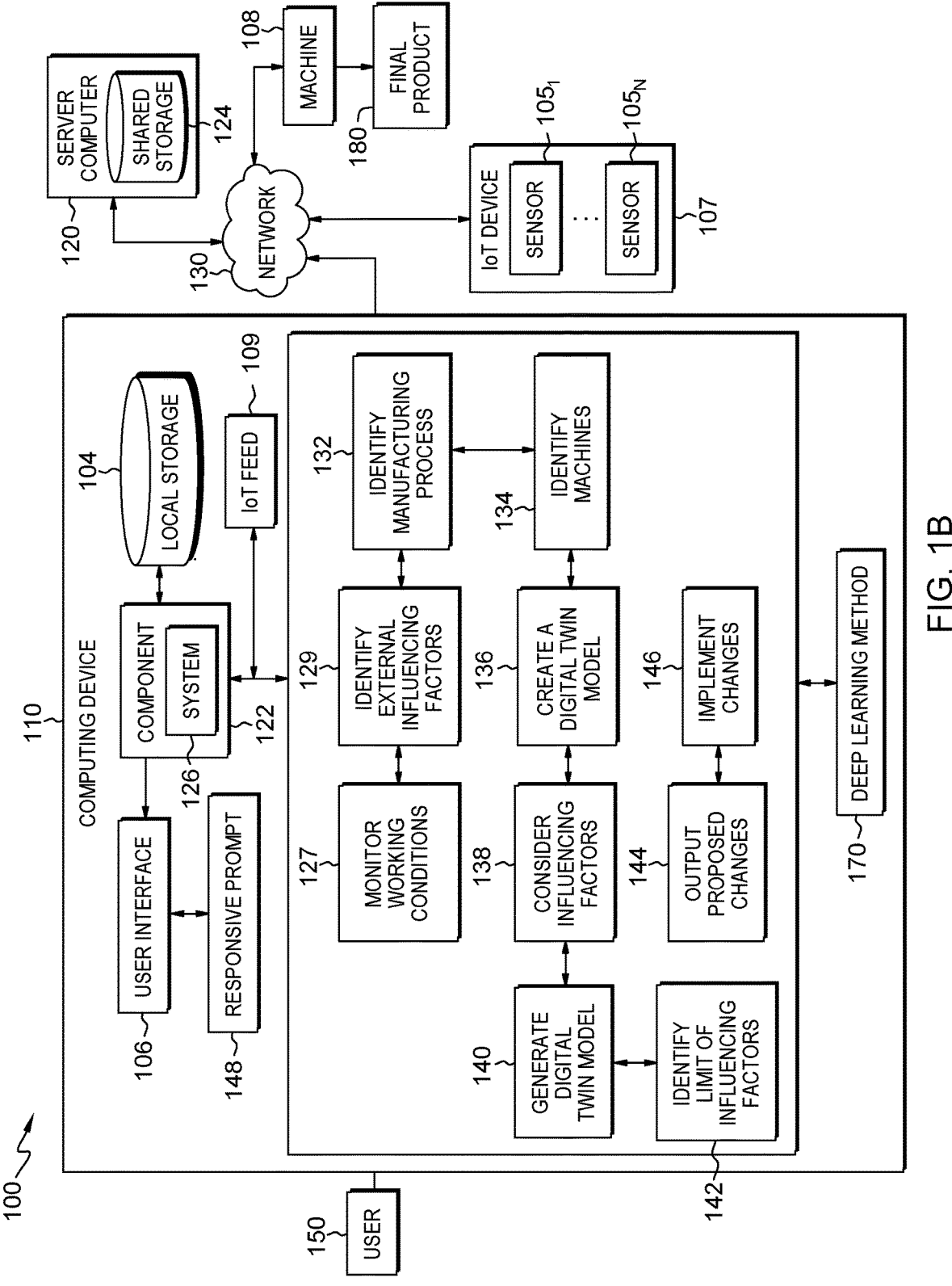
FIG. 1B is a functional block diagram illustrating a distributed data processing environment of a digital twin simulation engine component, in accordance with an embodiment of the present invention.

FIG. 1B is a block diagram illustrating a distributed data processing environment, generally designated distributed data processing environment 100, detailing component 122, in accordance with one embodiment of the present invention. The term "distributed" as used in this specification describes a computer system that includes multiple, physically distinct devices that operate together as a single computer system. FIG. 1B provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 122 monitors working conditions 127 of environment 100, via internet of things (IoT) devices 107. Component 122 may receive data, via IoT feed 109, associated with a work environment and/or machines 108 from IoT Devices 107. Machine 108 may represent one or more machines operating within environment 100. Machine 108 is an apparatus using or applying mechanical power and having several parts, each with a definite function and together performing a particular task. Machine 108 may represent a physical system using power to apply forces and control movement to perform an action. The term is commonly applied to artificial devices, such as those employing engines or motors, but also to natural biological macromolecules, such as molecular machines. An IoT device (IoT device 107) is a nonstandard computing device that connects wirelessly to a network (e.g., network 130) and possesses the ability to transmit data of said network and communicate with other computing devices and/or IoT devices. IoT devices 107 may be one or more IoT devices. IoT device 107 comprise sensor 105$_{1-N}$, wherein sensor 105$_{1-N}$, herein sensor(s) 105, monitor and detect a plurality of internal and/or external influencing factors (i.e., influencing factors) associated with environment 100 and/or machine 108, respectively. As used herein, N represents a positive integer, and accordingly the number of scenarios implemented in a given embodiment of the present invention is not limited to those depicted in FIG. 1B.

Sensor(s) 105 may be a device that detects or measures a physical property and then records or otherwise responds to that property, such as vibration, chemicals, radio frequencies, environment, weather, humidity, light, mechanical, etc. Sensor(s) 105 may be one or more sensors associated with one or more IoT Devices 107, respectively. Sensor(s) 105 may be one or more of a plurality of types of cameras, including, but not limited to, pin-hole, stereo, omni-directional, non-central, infrared, video, digital, three dimensional, panoramic, filter-based, wide-field, narrow-field, telescopic, microscopic, etc. In some embodiments, sensor(s) 105 include any device capable of imaging a portion of the electromagnetic spectrum. Sensor(s) 105 may be one or more of a plurality of types of microphones for detecting speech and other audible sounds. Sensor(s) 105 may be able to detect weather conditions, such as air temperature, relative humidity, presence and type of precipitation, wind speed, etc. Sensor(s) 105 may be GPS sensors. For example, sensor(s) 105 may use GPS to detect the location of the user of client computing device 110 or machine 108. Sensor(s) 105 may include various types of pressure sensors and/or strain gauges. Sensor(s) 105 may include various types of accelerometers to detect movement or vibration. In the depicted embodiment, component 122 identifies influencing factors 129 within the work environment or machine 108, via IoT device 107 and IoT feed 109. For example, component 122 identifies, via sensor(s) 105 and IoT feed 109, temperature, wind flow, dust, presence of various gases, components of air particles (like Sulphur particles in the air). Quality evaluation of products can be performed by sensor(s) 105 (e.g., color matching, camera feeds), and component 122, via sensor(s) 105, can identify which product, portion of product is defective or facing a problem. A problem is a matter or situation regarded as unwelcome or harmful and needing to be dealt with and overcome. For example, an issue involving industry machinery performance or manufactured product quality/quantity.

In the depicted embodiment, component 122 identifies manufacturing process 132. Component 122 may identify the process sequence for manufacturing a product. Component 122 may learn the manufacturing process 132 by analyzing and monitoring the manufacturing process over time, via IoT feed 109 and IoT device 107, and/or retrieving the manufacturing process from local storage 104 or shared storage 124. In some embodiments, component 122 identifies manufacturing process 132 from a set of predetermined manufacturing processes stored on local storage 104 or shared storage 124 or receives the manufacturing process from user 150. In the depicted embodiment, component 122 identifies machine 108 associated with the manufacture process 134, via sensor(s) 105 and IoT feed 109, based on the identified manufacturing process 132. Component 122 may identify machine 108 that are associated with manufacturing a product and monitor and determine the health of said machine 108, via sensor(s) 105 and IoT feed 109. In the depicted embodiment, component 122, via digital twin computing system (system) 126 creates a digital twin model 136. Component 122, via system 126, may create a digital twin model of machine 108 associated with the identified manufacturing process.

In the depicted embodiment, component 122 considers influencing factors 138 in the generated digital twin model of machine 108. For example, component 122 integrates influencing factors 138 into the digital twin model as input parameters to the digital twin model for simulation purpose. In various embodiments, component 122 may display the created/generated digital twin model of machine 108 to user 150 using interface 106. In the depicted embodiment, component 122, via system 126, generates digital twin model 140 of final product 180 associated with the identified manufacturing process based on identified influencing factors 129 and deep learning method 170. The generated digital twin model 140 of final product 180 is a visual representation of final product 180 that comprises predetermined quality parameters of said product. The predetermined quality parameters may be received from user 150 and/or retrieved from local storage 104 or shared storage 124. Component 122 may receive or retrieve various environmental parameters and predetermined product quality specifications associated with final product 180. The generated digital twin model 140 of final product 180 may be displayed, via interface 106.

Deep learning (DL) method 170 is applied to sensor based identification of various influencing factors and the quality of final product 180. Component 122, via deep learning methods, accounts for the dynamic change in influencing factors (e.g., changes in amount of dust or predetermined particles in the air). Component 122 may create a knowledge corpus for each identified influencing factor, machine 108, and/or quality of a final product 180. In the depicted embodiment, component 122 identifies, via sensor(s) 105 and digital twin models 136 and 140, a maximum limit 142 of influencing factors in environment 100 that effect final product 180. For example, using sensor(s) 105 and IoT feed 109, component 122 evaluate the degree of influencing factors in the predetermined surrounding, that includes concentration of dust, wind flow, smell, various particles in the air, wherein based on the identified influencing factors, component 122 identifies if any of the one or more influencing factor can create a predetermined minimum impact on the machine or work product. Thus, component 122 utilizes a digital twin simulation method where the identified influencing factors are used to identify the types of problems that can or are actively happening to the machines or work product. In some embodiments, component 122 uses historical data to learn and identify what types of problem can happen to the machine or work product based on the identified influencing factors.

Component 122 may possess a set of robotic or automation processes which can address the influencing factors, and accordingly component 122 may command one or more robotic systems to control the influencing factors. For example, 3D printing is performed or painting is performed in dusty environment, and accordingly the robotic system receive instructions to create a fencing or covering to prevent or reduce the amount of dust in the environment. In the depicted embodiment, component 122 outputs proposed changes 144 based on the identified maximum limit of influencing factors on the quality of final product 180. In some embodiments, the output proposed changes are displayed to user 150 through interface 106 as responsive prompts 148. Component 122 may be responsive to user's 150 response(s) to responsive prompts 148 and implement the proposed changes 146 responsive to the user 150 received input associated with responsive prompts 148.

Figure 2:
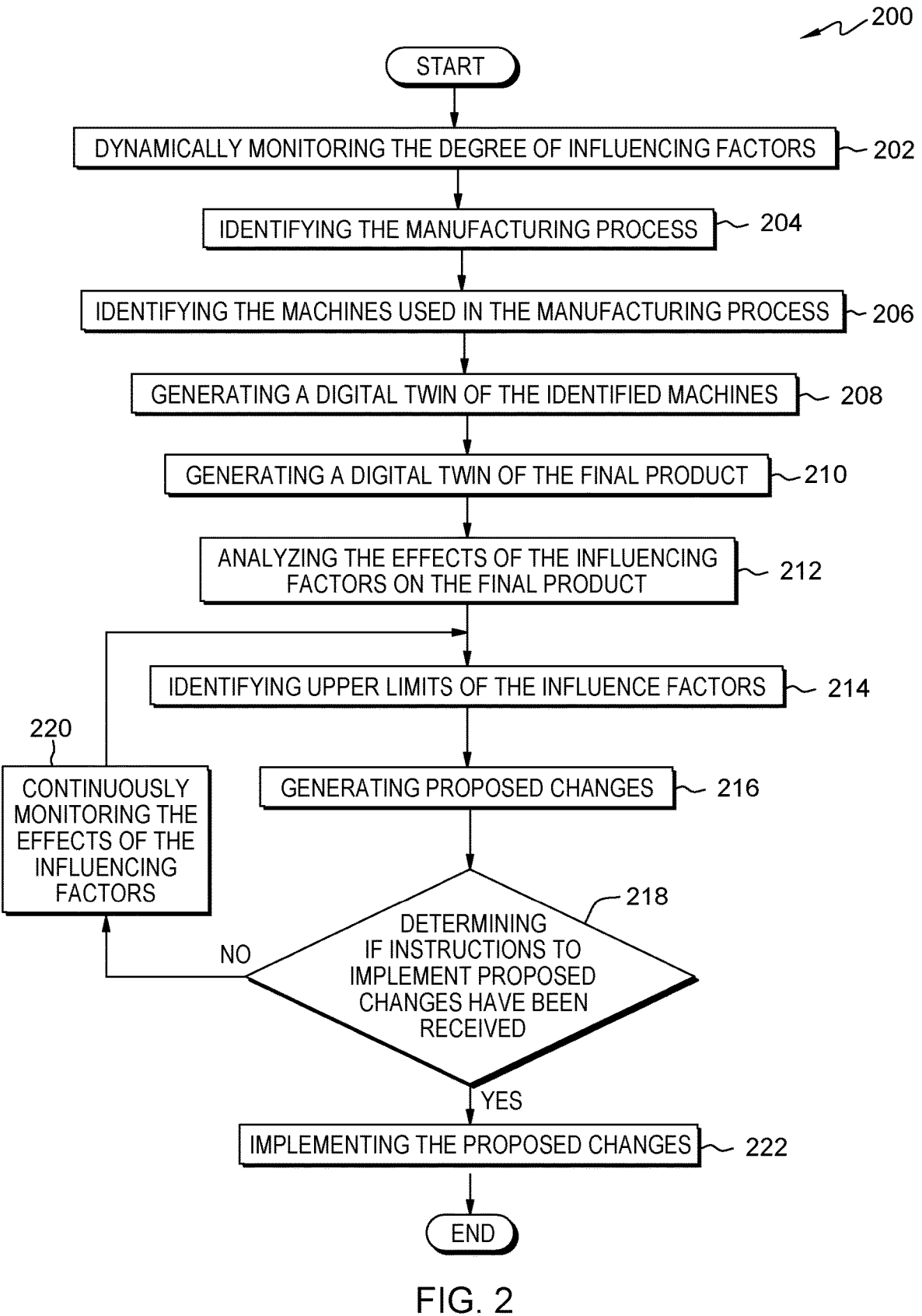
FIG. 2 illustrates operational steps of the digital twin simulation engine component, on a server computer within the distributed data processing environment of FIGS. 1A through 1B in accordance with an embodiment of the present invention.

FIG. 2 illustrates operational steps of component 122, generally designated 200, in communication with server computer 120, within distributed data processing environment 100, for a computer-based implementation of a service chain node adequacy framework, in accordance with an embodiment of the present invention. FIG. 2 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 dynamically monitors the degree of influencing factors in a predetermined area. In various embodiments, component 122, via IoT devices, monitors and measures the degree of predetermined influencing factors in a predetermined area.

In step 204, component 122 identifies the manufacturing process. In various embodiments, component 122, via IoT devices, identify the manufacturing process of a predetermined final product. In some embodiments, component 122 receive or retrieve the manufacturing process from a user or from a database.

In step 206, component 122 identifies the machines used in the manufacturing process associated with producing the predetermined final product. In various embodiments, component 122, via IoT devices and/or the identified manufacturing process, identifies one or more machines used in the manufacturing process associated with producing the predetermined final product.

In step 208, component 122 generates a digital twin of the identified machines. In various embodiments, component 122, via a digital twin computing system, generates a digital twin of the identified machines used in the manufacturing process.

In step 210, component 122 generating a digital twin of the final product associated with the identified manufacturing process. In various embodiments, component 122 generates a digital twin of the predetermined final product associated with the identified machines and manufacturing process.

In step 212, component 122 analyzes the effects of the influencing factors on the final product. In various embodiments, component 122 analyzes the effects of the identified influencing factors on the predetermined final products and/or the identified machines. In various embodiments, component 122 considers the identified influencing factors and simulates the impact of the influencing factors on the machines to identify if health of those machines or the working condition of the said machines. Component 122 may simulate the presence of the influencing factors, wherein if the influencing factors can degrade the quality of the work product or machine then component 122 may address the influencing factors accordingly, via an AI enabled system, and identify how to control the influencing factors to maintain the quality of the work products. In some embodiments, component 122, via AI enabled system, recommends how the influencing factors can be controlled from the surrounding.

In step 214, component 122 identifies the upper limits of the influencing factors. In various embodiments, component 122, via the digital twin simulation engine, utilizes the influencing factors in the digital twin model simulation, wherein during the simulation, component 122 implements various combinations of the influencing factors, and various levels/concentration of influencing factors to identity the maximum level of allotment of influencing factors on the machines before the influencing factors impact the machines and/or product quality of the final product.

In step 216, component 122 generates proposed changes based on the identified upper limits. In various embodiments, component 122 generates one or more proposed changes to the machines and/or manufacturing process, wherein the one or more proposed changes are displayed to a user, via a user interface, as a responsive prompt.

In step 218, component 122 determines if instructions to implement the proposed changes have been received. In various embodiments, component 122, based on one or more received responses from the user associated with the responsive prompt(s), determines if instructions to implement the proposed changes have been received. In the depicted embodiment, if component 122 determines that no response from the user has been received or that component has received instructions from the user to reject the proposed changes (No step) then component 122 advances to step 220. However, if component 122 receives instructions from a user to implement the proposed changes (Yes step) then component 122 advances to step 222.

In step 220, component 122 continuously monitors the effects of the influencing factors. In various embodiments, component 122 continuously monitors the effects of the influencing factors on the machines and/or work quality of the final product.

In step 222, component 122 implements the proposed changes. In various embodiments, responsive to the user's response to the generated prompts, component 122 implements the proposed changes to the machines and/or work environment. Component 122 may dynamically adjust the monitoring systems to reflect the implemented proposed changes. In some embodiments, component 122 outputs a list of actions and instructions for the user to implement the proposed changes. In various embodiments, component 122, via an AI enabled system, predicts the of the influencing impact in the machine or work product and will proactively be taking automation activity so that the external influencing factors can be prevented.

Figure 3:
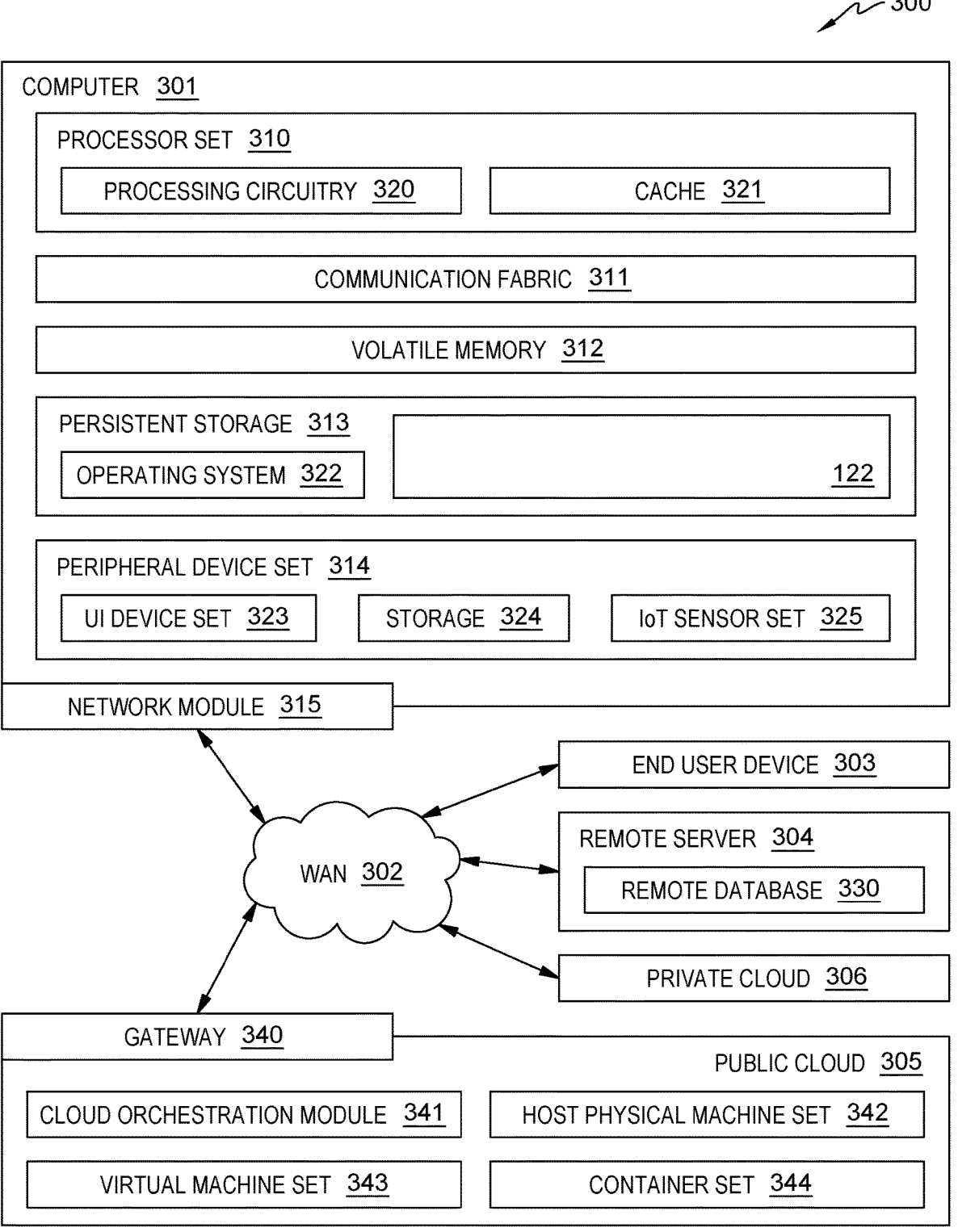
FIG. 3 depicts a block diagram of components of the server computer executing the digital twin simulation engine component within the distributed data processing environment of FIG. 1A through 1B, in accordance with an embodiment of the present invention.

FIG. 3 depicts a block diagram of components of server computer 120 within distributed data processing environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as digital twin simulation engine code 400. Component 122 may be represented and encompassed by code 400. In addition to code 400, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and code 400, as identified above), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 1. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in code 400 in persistent storage 313.

COMMUNICATION FABRIC 311 is the signal conduction paths that allow the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in code 400 typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
dynamically monitoring a degree of influencing factors in a predetermined area;
identifying one or more machines used in a predetermined manufacturing process;
generating a digital twin of a predetermined final product associated with the predetermined manufacturing process;
utilizing the digital twin to analyze an effect of the influencing factors on the identified one or more machines or the predetermined final product;
identifying upper limit of the influencing factors based on the analysis of the digital twin;
identifying which portion of a product is defective based on the analysis and output of a digital twin of the product;
utilizing a set of robotic or automation processes to address the influencing factors, and commanding one or more robotic systems to control the influencing factors, wherein utilizing the set of robotic or automations processes comprises:
instructing the set of robotic or automations processes to create a barrier to prevent or reduce the amount of influencing factors around the predetermined final product; and
dynamically adjusting a monitoring system to reflect actions taken to address the influencing factors.

2. The computer implemented method of claim 1, further comprising:
measuring a degree of predetermined influencing factors in the predetermined area.

3. The computer implemented method of claim 1, further comprising:
identifying the predetermined manufacturing process.

4. The computer implemented method of claim 1, further comprising:
generating a digital twin of the identified one or more machines used in the predetermined manufacturing process.

5. The computer implemented method of claim 1, further comprising:
simulating the effect of the influencing factors on the one or more machines or predetermined final product to identify a condition of the one or more machines.

6. The computer implemented method of claim 1, wherein identifying the upper limit of the influencing factors further comprises:
implementing various combinations and concentrations of the influencing factors to identity a maximum level of allotment of the influencing factors on the one or more machines prior to the effect of the influencing factors affecting the one or more machines or product quality of the final product.

7. The computer implemented method of claim 1, further comprising:
simulating a presence of the influencing factors, wherein, based on an identified reaction to the influencing factors on production quality of the predetermined final product, utilizing the simulation of the presence of the influencing factors to identify methods of controlling a level or presence of the influencing factors.

8. A computer system, the computer system comprising:

one or more computer processors;

one or more computer readable storage devices; and program instructions stored on the one or more computer readable storage devices, the program instructions, when executed by the one or more computer processors, cause the one or more processors to:

dynamically monitor a degree of influencing factors in a predetermined area;

identify one or more machines used in a predetermined manufacturing process;

generate a digital twin of a predetermined final product associated with the predetermined manufacturing process;

utilize the digital twin to analyze an effect of the influencing factors on the identified one or more machines or the predetermined final product;

identify an upper limit of the influencing factors based on the analysis of the digital twin;

identify which portion of a product is defective based on the analysis and output of a digital twin of the product; program instructions to utilize a set of robotic or automation processes to address the influencing factors, and commanding one or more robotic systems to control the influencing factors, wherein utilizing the set of robotic or automations processes comprises:

instruct the set of robotic or automations processes to create a barrier to prevent or reduce the amount of influencing factors around the predetermined final product; and dynamically adjust a monitoring system to reflect actions taken to address the influencing factors.

9. The computer system of claim 8, further comprising: program instructions, when executed by the one or more computer processors, cause the one or more processors to:

measure a degree of predetermined influencing factors in the predetermined area.

10. The computer system of claim 8, further comprising: program instructions, when executed by the one or more computer processors, cause the one or more processors to:

identify the predetermined manufacturing process.

11. The computer system of claim 8, further comprising: program instructions, when executed by the one or more computer processors, cause the one or more processors to:

generate a digital twin of the identified one or more machines used in the predetermined manufacturing process.

12. The computer system of claim 8, further comprising: program instructions, when executed by the one or more computer processors, cause the one or more processors to:

simulate the effect of the influencing factors on the one or more machines or predetermined final product to identify a condition of the one or more machines.

13. The computer system of claim 8, wherein identifying the upper limit of the influencing factors further comprises: program instructions, when executed by the one or more computer processors, cause the one or more processors to:

implement various combinations and concentrations of the influencing factors to identity a maximum level of allotment of the influencing factors on the one or more machines prior to the effect of the influencing factors affecting the one or more machines or product quality of the final product.

14. The computer system of claim 8, further comprising: program instructions, when executed by the one or more computer processors, cause the one or more processors to:

simulate a presence of the influencing factors, wherein, based on an identified reaction to the influencing factors on production quality of the predetermined final product, utilizing the simulation of the presence of the influencing factors to identify methods of controlling a level or presence of the influencing factors.

15. A computer program product, the computer program product comprising:

one or more computer readable storage devices and program instructions stored on the one or more computer readable storage devices, the program instruction, when executed by one or more processors, cause the one or more processors to:

dynamically monitor a degree of influencing factors in a predetermined area;

identify one or more machines used in a predetermined manufacturing process;

generate a digital twin of a predetermined final product associated with the predetermined manufacturing process;

utilize the digital twin to analyze an effect of the influencing factors on the identified one or more machines or the predetermined final product;

identify an upper limit of the influencing factors based on the analysis of the digital twin;

identify which portion of a product is defective based on the analysis and output of a digital twin of the product;

utilize a set of robotic or automation processes to address the influencing factors, and commanding one or more robotic systems to control the influencing factors, wherein utilizing the set of robotic or automations processes comprises:

instruct the set of robotic or automations processes to create a barrier to prevent or reduce the amount of influencing factors around the predetermined final product; and dynamically adjust a monitoring system to reflect actions taken to address the influencing factors.

16. The computer program product of claim 15, further comprising: program instructions, when executed by the one or more computer processors, cause the one or more processors to:

identify the predetermined manufacturing process.

17. The computer program product of claim 15, further comprising: program instructions, when executed by the one or more computer processors, cause the one or more processors to:

generate a digital twin of the identified one or more machines used in the predetermined manufacturing process.

18. The computer program product of claim 15, further comprising: program instructions, when executed by the one or more computer processors, cause the one or more processors to:

simulate the effect of the influencing factors on the one or more machines or predetermined final product to identify a condition of the one or more machines.

19. The computer program product of claim 15, wherein identifying the upper limit of the influencing factors further comprises: program instructions, when executed by the one or more computer processors, cause the one or more processors to:

implement various combinations and concentrations of the influencing factors to identity a maximum level of allotment of the influencing factors on the one or more machines prior to the effect of the influencing factors affecting the one or more machines or product quality of the final product.

20. The computer program product of claim 15, further comprising: program instructions, when executed by the one or more computer processors, cause the one or more processors to:

simulate a presence of the influencing factors, wherein, based on an identified reaction to the influencing factors on production quality of the predetermined final product, utilizing the simulation of the presence of the influencing factors to identify methods of controlling a level or presence of the influencing factors.

\* \* \* \* \*